Dec. 28, 1948.　　　　　D. P. GRAHAM　　　　　2,457,658
GAS AND LIQUID CONTACT APPARATUS
Filed Sept. 12, 1946　　　　　　　　　　5 Sheets-Sheet 1
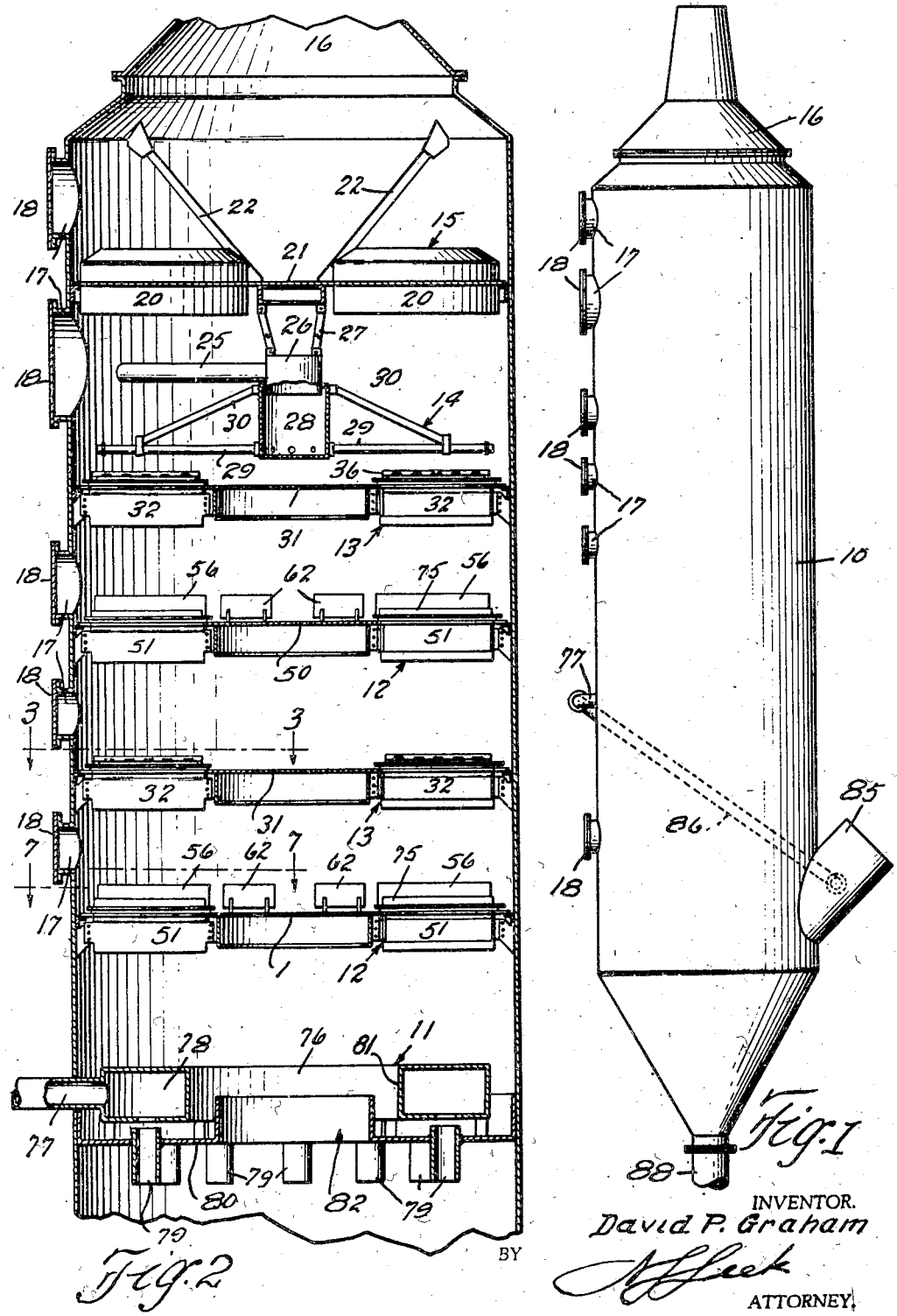
INVENTOR.
David P. Graham
BY
ATTORNEY Dec. 28, 1948.　　　D. P. GRAHAM　　　2,457,658
GAS AND LIQUID CONTACT APPARATUS
Filed Sept. 12, 1946　　　5 Sheets-Sheet 2
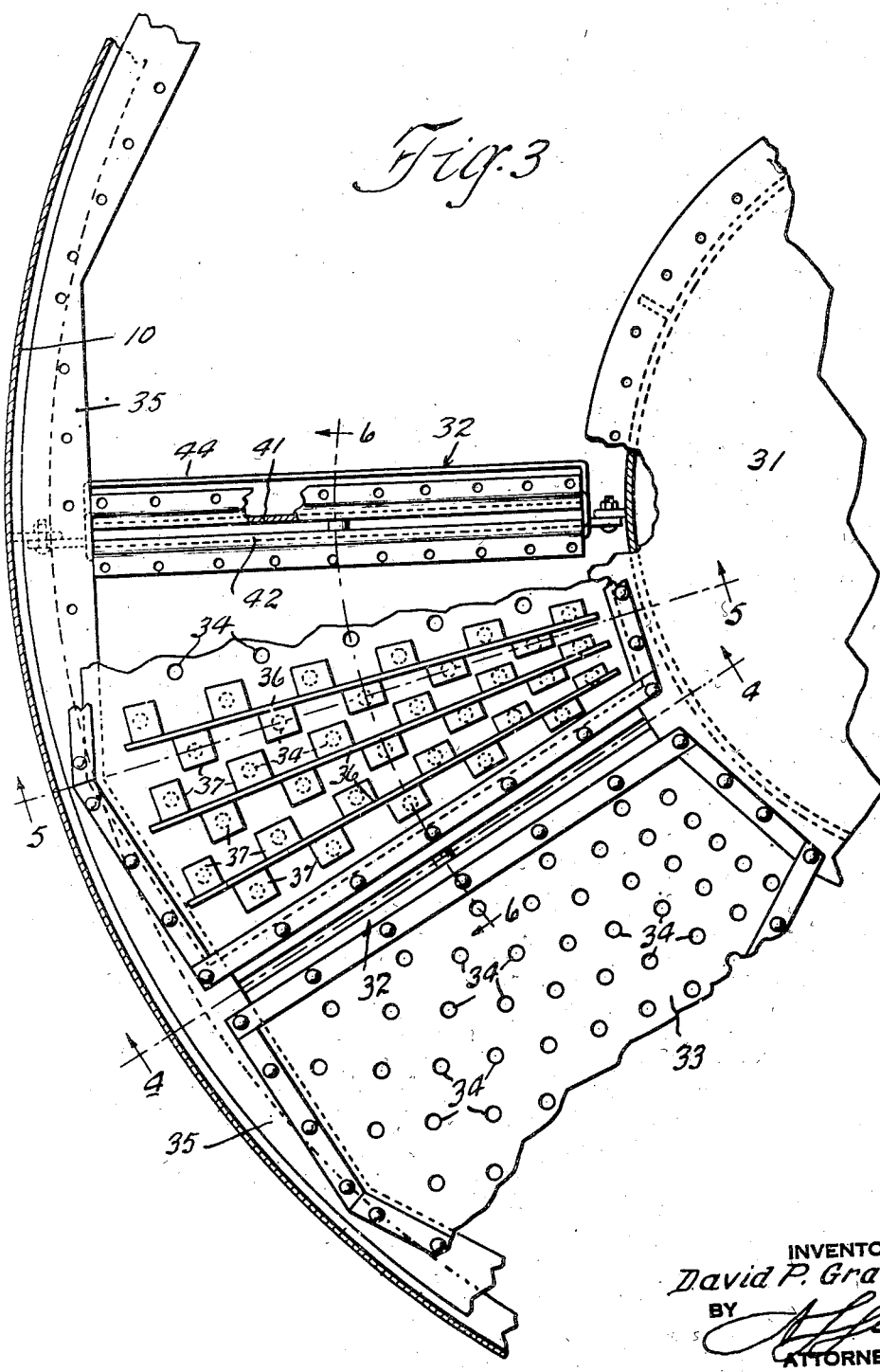
INVENTOR
David P. Graham
BY
ATTORNEY Dec. 28, 1948.  D. P. GRAHAM  2,457,658
GAS AND LIQUID CONTACT APPARATUS
Filed Sept. 12, 1946  5 Sheets-Sheet 3
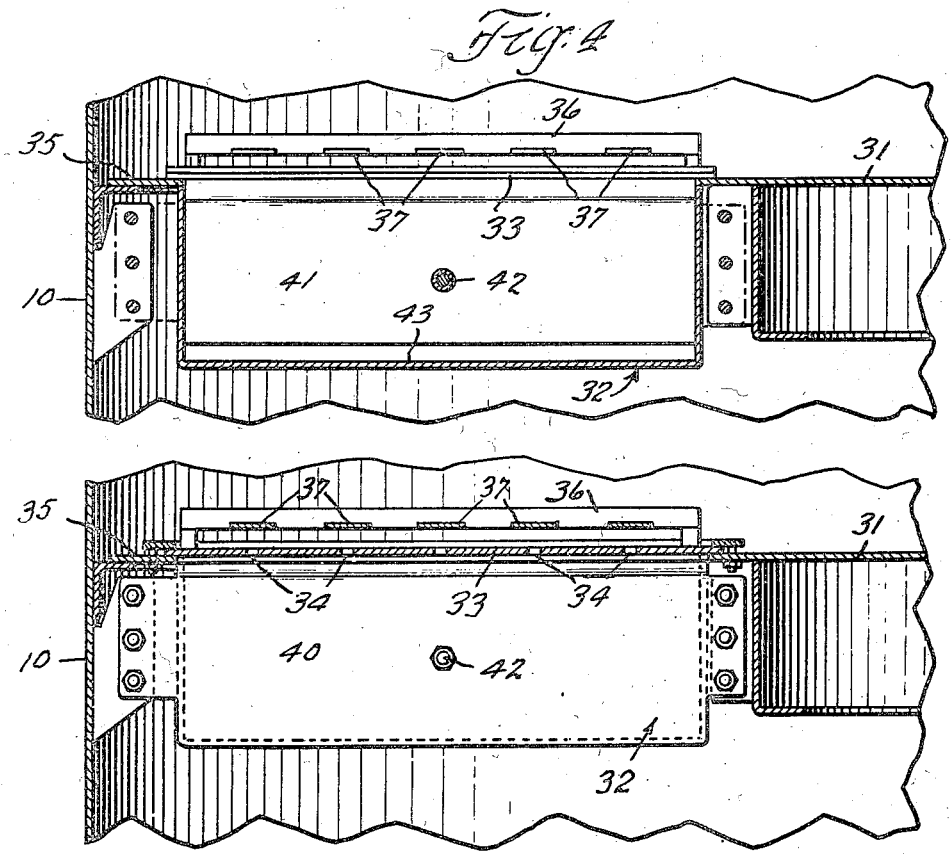
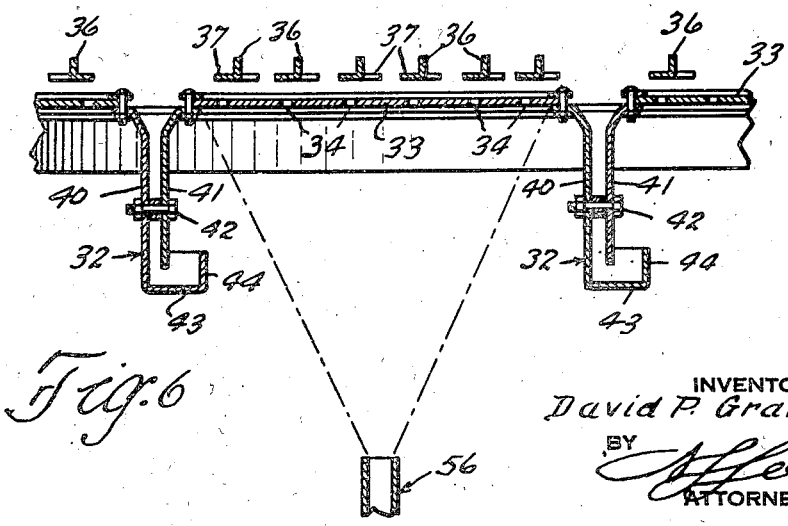
INVENTOR
David P. Graham
BY
ATTORNEY Dec. 28, 1948. D. P. GRAHAM 2,457,658
GAS AND LIQUID CONTACT APPARATUS
Filed Sept. 12, 1946 5 Sheets-Sheet 4

INVENTOR
David P. Graham
BY
ATTORNEY

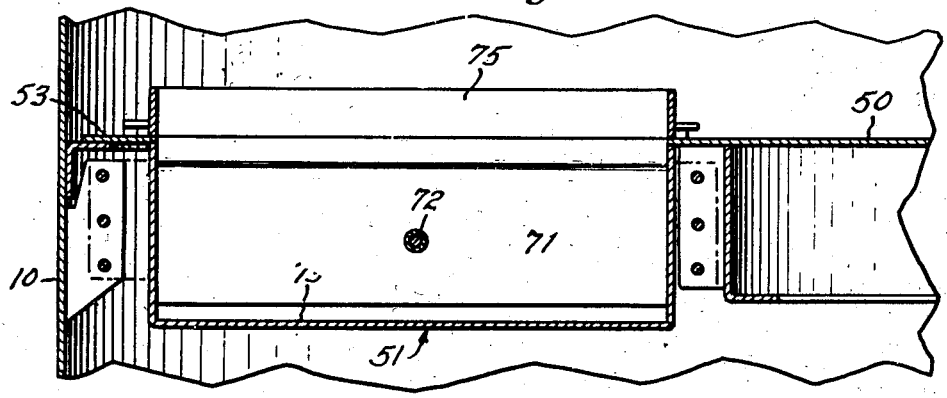
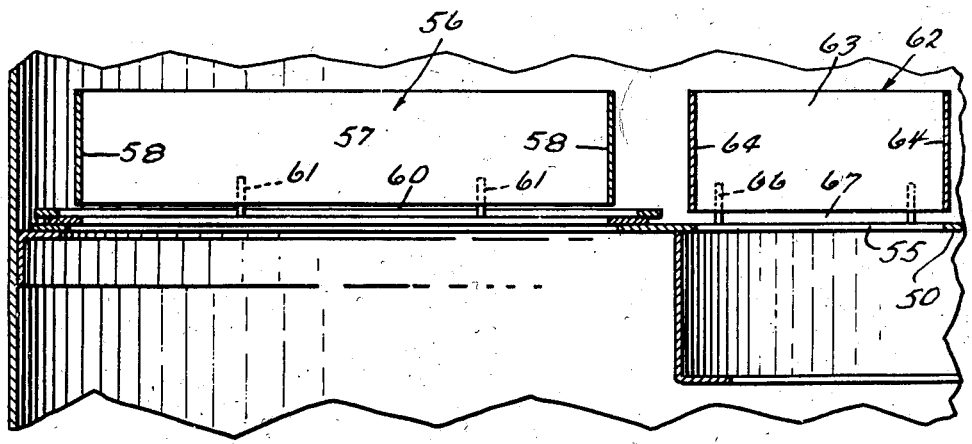
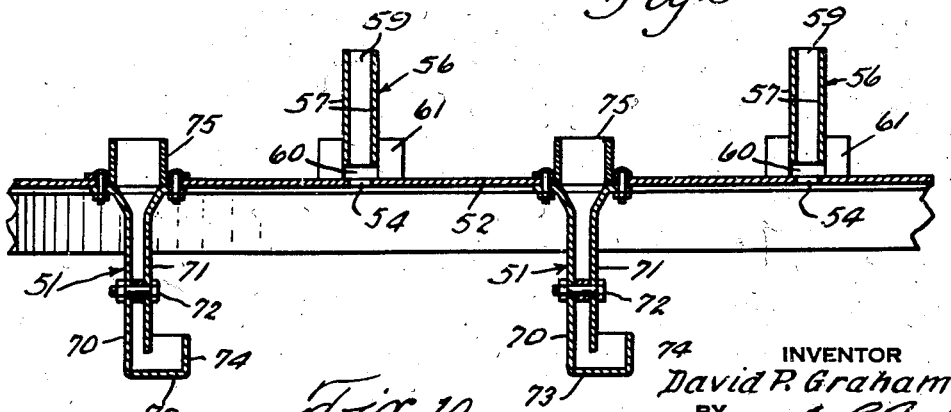

Patented Dec. 28, 1948

2,457,658

UNITED STATES PATENT OFFICE 2,457,658

GAS AND LIQUID CONTACT APPARATUS

David P. Graham, Westbury, N. Y., assignor to Peabody Engineering Corporation, New York, N. Y., a corporation of New York Application September 12, 1946, Serial No. 696,605

6 Claims. (Cl. 261—113)

This invention relates to gas and liquid contact apparatus of the type having one or more diaphragms containing apertures forming orifices through which the gas passes upwardly at a velocity suited to prevent the liqud on the diaphragms from passing downwardly through said orifices. Such apparatus may be for cleaning or cooling gases or for liqud-gas contact purposes. An apparatus of this general type is disclosed in U. S. Patent No. 2,319,814 to R. R. Harmon, dated May 25, 1943.

An object of the present invention is to provide novel and improved means for washing the undersides of the orifice plates in an apparatus of the above type.

Another object is to provide novel and improved means for producing a liquid spray for cleaning the gas and washing the lower surfaces of the orifice plates.

Another object is to form a mixture of a gas and liquid under conditions such that the finer solid particles are agglomerated and are thus made more readily removable from the gas.

Various other objects and advantages will be apparent as the nature of the invention is more fully disclosed.

In accordance with the present invention, a spray zone is located beneath each separating zone. This spray zone comprises a diaphragm extending across the apparatus and adapted to hold a predetermined depth of liquid thereon. The diaphragm contains aspirating slots through which the gas travels upwardly at a velocity sufficient to keep the liquid from flowing downwardly through the slots. As the gas travels upwardly through the slots, however, it picks up liquid droplets from the layer of liquid on the diaphragm to thereby form a spray. Passages are formed above the slots by vertical spaced plates which extend downwardly towards the diaphragm, but are spaced sufficiently therefrom to permit the liquid to pass beneath the lower ends of the plates into the rising gas stream. The aspirated liquid and gas rising through these passages become intimately mixed in the form of a spray and the passages are arranged to direct this spray onto the underside of the orifice plate of the next cleaning zone.

The aspirating slots are preferably rectangular in shape and the spray passages are made similar in shape so as to effect maximum turbulence and maximum uniformity of the spray. The slots preferably extend radially of the diaphragm. They may, however, be otherwise disposed, such as circularly or circumferentially, depending upon the construction of the apparatus. Likewise, the plates forming the spray passages may converge or diverge upwardly as required in order to effect the maximum dispersion of the liquid in the rising gas stream.

Although the novel features which are believed to be characteristic of this invention are pointed out more particularly in the claims appended hereto, the nature of the invention will be better understood by referring to the following description, taken in connection with the accompanying drawings in which a specific embodiment thereof has been set forth for purposes of illustration.

In the drawings:

Fig. 1 is a side elevation of a gas scrubber embodying the present invention;

Fig. 2 is a vertical section through a portion of the gas scrubber taken on a larger scale;

Fig. 3 is a horizontal section on a still larger scale taken on the line 3—3 of Fig. 2;

Figure 7:
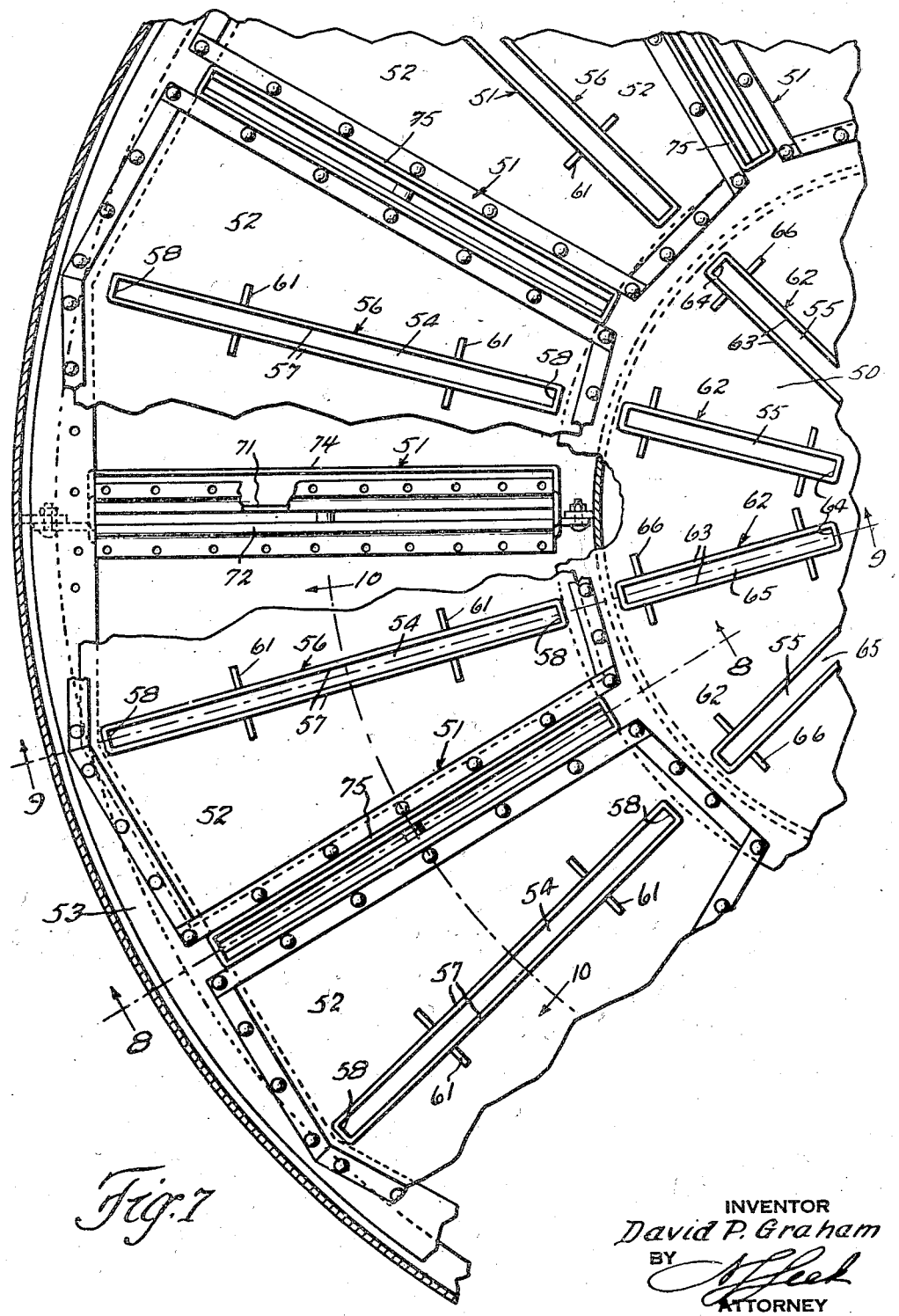

Figs. 4 and 5 are vertical radial sections taken on the lines 4—4 and 5—5 respectively of Fig. 3;

Fig. 6 is a partial vertical section taken on the line 6—6 of Fig. 3;

Fig. 7 is a partial horizontal section taken on the line 7—7 of Fig. 2, but on the same scale as Fig. 3;

Figs. 8 and 9 are vertical radial sections taken on the lines 8—8 and 9—9 respectively of Fig. 7; and Fig. 10 is a partial vertical section taken on the line 10—10 of Fig. 7.

Referring to the drawings more in detail, the invention is shown as embodied in a gas scrubber comprising a vertical cylindrical casing or shell 10 having a lower spray-forming zone 11 (Fig. 2), a plurality of spraying zones 12, a plurality of cleaning or cooling zones 13, a liquid inlet zone 14, an entrained moisture-eliminating zone 15, and an upper gas outlet duct 16. The shell 10 is provided with cleaning openings 17 at the various zones which are closed by removable covers 18.

The entrained moisture-eliminating zone 15 comprises a plurality of centrifugal eliminators 20 which may be of any standard construction having for example radial vanes to cause the gases to pass upwardly therethrough at an increasing velocity and to rotate so as to remove liquid droplets centrifugally. The eliminators, as shown in Fig. 2, are mounted on a plate 21 which is supported peripherally by the shell 10 and centrally by a plurality of struts 22 which extend to the top of said shell.

The liquid, such as water, is supplied at the liquid inlet zone 14 through a supply duct 25 which extends from the shell 10 to a central cup 26 supported by struts 27 from the plate 21. The cup 26 opens downwardly into a receiver 28 which is attached thereto and carries a plurality of radial perforated pipes 29 which are supported by struts 30. The pipes 29 communicate with the receiver 28 and are perforated to discharge the liquid onto the top cleaning or cooling zone 13.

Each cleaning or cooling zone 13, as shown in Figs. 2 to 6, comprises a central imperforate diaphragm 31 supported by a plurality of radial struts 32 which are attached at their outer ends to the shell 10. Pie-shaped perforated plates 33 having orifices 34 therein (Fig. 3) are attached to the central diaphragm 31, radial struts 32 and to a peripheral flange 35. Baffle grids 36 having baffles 37 which are disposed above each orifice 34 are positioned above and secured to the orifice plates 33. The baffles 37 are so arranged that the gases passing upwardly through the orifices 34 impinge thereon.

The radial struts 32 constitute drain troughs through which the liquid flows downwardly from one zone to the next. These troughs comprise plates 40 and 41 (Fig. 6) secured by suitable means shown as bolts 42 and spaced to receive liquid therebetween. The plate 40 terminates at its lower end in a bottom lip 43 having an upstanding rim 44 forming a trough in which the liquid is received and is maintained at a height to form a liquid seal with the bottom edge of the plate 42. The liquid overflows the rim 44 onto the next lower zone. The construction of the cleaning and cooling zone is similar to that disclosed in the Harmon patent above referred to. Hence the elements thereof are not set forth in detail herein, and only so much thereof has been disclosed as is necessary to an understanding of the present invention.

Each spray zone 12, as shown in Figs. 2 and 7 to 10, comprises a central diaphragm 50 supported by a plurality of radial struts 51, which are similar to the struts 32 above described and are secured at their outer ends to the shell 10. Pie-shaped plates 52 are secured to the central diaphragm 50, struts 51, and to a peripheral flange 53 attached to the shell 10. These plates 52 are imperforate except for central radial rectangular slots 54. The diaphragm 50 is also shown as provided with radial slots 55 in alignment with the radial slots 54 in the plate 52. The diaphragm slots may, however, be omitted if desired.

Rectangular members 56 having side walls 57 and end walls 58, defining a rectangular passage 59, are disposed above the plate 52 with the passages 59 registering with the slots 54. The lower ends of the walls 57 and 58 are spaced above the plate 52 to form an opening 60 for the passage of liquid. The members 56 are supported by brackets 61 attached to the plate 52. In the embodiment shown the side walls 57 are parallel to each other, although they may diverge or converge upwardly as required to produce a spray having the required characteristics.

Similar members 62 having side walls 63 and end walls 64 defining passages 65 are supported on the diaphragm 50 by brackets 66 with their passages 65 registering with the slots 55. The lower ends of the members 62 are spaced from the surface of the diaphragm 50 to form liquid passages 67. The members 56 and 62 extend upwardly to direct a spray from the passages 59 and 65 upwardly against the under surface of the orifice plates 33 of the adjacent cleaning zone 33 and are disposed in a radial position to register with the radial center line of said orifice plates.

The radial struts 51 are formed by side walls 70 and 71 which are spaced apart and secured by suitable means shown as bolts 72 and are attached at their upper edges to the plate 52 in a position to receive liquid which is discharged from said plate. The wall 70 is shown as provided with a bottom lip 73 having a rim 74 extending therearound and over which the liquid is discharged. The rim 74 is of a height to form a liquid seal with the lower edge of the wall 70. A weir 75 is attached to the plate 52 and is disposed around the opening to the discharge duct formed by the struts 51. The weir 75 determines the level of liquid on the plate 52 and is of such height that a liquid head is maintained at the openings 60 and 67.

The spray zone 11 comprises a ring 76 to which gas is supplied from an inlet duct 77. The ring 76 is mounted coaxially with shell 10 and is provided on its lower side with a plurality of gas discharge openings 78. Tubes 79 are mounted in an annular plate 80 to register with the openings 78, but are spaced therefrom to permit liquid to flow into the open tops of the tubes 79 in the manner to be described. The annular plate 80 is provided with an inner circular flange 81 defining a central opening 82 through which the gas passes upwardly. The flange 81 is adapted to maintain a liquid head at the entrance to the tubes 79.

Gas for cleaning or cooling is supplied to the shell 10 through a supply duct 85 (Fig. 1) at a point beneath the spray zone 11. A by-pass duct 86 connects the duct 85 with the duct 77 to supply a portion of the inlet gas to the ring 76. The lower end of the casing 10 communicates with a discharge pipe 86 which may be controlled by the usual valves, not shown.

*Operation*

In the operation of this device, the gas which is to be cleaned or cooled is supplied to the duct 85 and the major portion of this gas enters the lower zone of the shell 10 and passes upwardly through the opening 82. A portion, however, is by-passed by the duct 86 and enters the gas ring 76. Liquid is supplied through the duct 25 and enters through the receiver 28 and pipes 29 from which it is discharged onto the top cleaning zone 13 and flows down from zone to zone through the drain passages in the struts 32 and 51.

The liquid forms a blanket of fixed depth on the perforated plates 33 of the cooling zones 13. The excess liquid then overflows through the drain passages in the struts 32 and over the rims 44 to the next zone. The struts 32 are so arranged as to form a liquid seal which prevents the gas from passing upwardly through the drain passages. Hence the only path open for the upward gas flow is through the orifices 34 of the plates 33.

The gas flows upwardly through these orifices at a velocity which prevents the liquid from flowing downwardly therein and thus maintains a liquid blanket of fixed depth on the top of the orifice plates 33 as above described.

In passing upwardly the gases impinge on the baffles 37 and are deflected as they continue their upward path. Hence the dust and other particles are entrapped and removed by the liquid blanket and the cleaned gas continues upwardly, while the liquid with the entrapped particles flows downwardly through the drain passages onto the plates of the next zone.

In the spray-forming zones 12 a liquid blanket is maintained on the plates 52 to a height which is determined by the height of the weirs 75. Any excess liquid flows downwardly over the weirs 75 and through the drain passages between the walls 70 and 71 and over the rims 74 onto the plates of the next zone. At the same time the gases which are flowing upwardly at high velocity pass through the slots 54, and prevent the liquid from flowing downwardly through these slots. However, the liquid head, due to the height of the weirs 75, tends to cause the liquid to flow through the passages 60 at a rate depending upon the head which is thus maintained and on the size of the passages 60. The gases which are passing upwardly from the slots 54 through the passages 59 pick up this liquid and carry the same along in the form of a spray.

The rectangular shape of the passages 59 causes the liquid and gas to be violently agitated within said passages and effects a uniform distribution of the liquid spray. The spray which is thus formed, which is still traveling at high velocity, passes outwardly from the top of the passages 59 and impinges on the bottom of the orifice plates 33 of the cooling and washing zone next above.

The arrangement is such that the spray is dispersed uniformly across the bottom of the orifice plates 33 for washing the same. A portion of this liquid is carried upwardly through the orifices 34 with the rising gases. The major portion, however, after washing the bottom of the orifice plates, falls back into the blanket of water which is maintained upon the plates 52.

By the spray-forming mechanism above described, it is possible to completely wash the underside of the various orifice plates without the use of special spray apparatus such as pumps or rotating nozzles as the velocity of the gas itself is utilized for producing the spray and causing the same to impinge upon and wash the orifice plates.

The liquid overflowing from the lowest spray zone 12 falls onto the plate 80. The liquid level on the plate 80 is maintained above the tops of the tubes 79 so as to provide a head to force the liquid into said tubes. The incoming gases from the gas ring 76 flow downwardly through the openings 78 and the tubes 79 at a high velocity and in so doing pick up liquid droplets which have entered the tubes 79 and produce a spray. This spray then partially washes the portion of the gases in the lower zone of the shell 10 and any that is entrained passes upwardly through the central opening 82 with the main gas stream. The liquid which overflows the lip 81 accumulates in the bottom of the shell and is discharged together with its accumulated impurities through the pipe 88.

It is to be understood of course that the tubes 79 here shown as circular in section for purposes of illustration may be replaced by slots similar to the slots 54 above described and may extend radially or peripherally as desired. Similarly, the slots 54 and the passages 59 may be circular or of any other cross section if desired in any particular instance, although the rectangular cross section is preferred in view of the greater uniformity of the spray produced thereby. These slots normally provide a heavy spray with considerable volume of liquid which washes the underside of the orifice plates as above described. The mixing of the gas with the liquid in the constricted passages 59 serves to agglomerate the fine particles and to thereby facilitate their subsequent removal in the cleaning zones.

The quality of the spray may be varied by adjusting the height of the weirs 75 and the spacing of the walls 57 and 58 from the plates 52, and by adjusting the gas velocity.

Although certain specific embodiments of the invention have been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. In a gas and liquid contact apparatus, a treating zone comprising an orifice plate carrying a blanket of liquid and containing orifices through which the gas to be treated passes upwardly at a rate to prevent downward flow of the liquid therethrough and baffles over said orifices against which the gases impinge, and a spray zone beneath said treating zone, said spray zone comprising a diaphragm having openings through which said gas passes upwardly, means maintaining a blanket of liquid on said diaphragm and means forming unobstructed passages extending upwardly above said openings and registering therewith, said means having an opening into said liquid blanket to permit liquid to flow into said passages and to be picked up by the rising gas therein to form a spray, said passages being positioned to discharge the spray onto the under surface of said orifice plate.

2. In a gas and liquid contact apparatus, a treating zone comprising an orifice plate carrying a blanket of liquid and containing orifices through which the gas to be treated passes upwardly at a rate to prevent downward flow of the liquid therethrough and baffles over said orifices against which the gases impinge, and a spray zone beneath said treating zone, said spray zone comprising a diaphragm having openings through which said gas passes upwardly, means maintaining a blanket of liquid on said diaphragm, members forming open-ended passages extending upwardly above said openings and registering therewith, said members having their lower ends extending into said liquid blanket but spaced above said diaphragm to permit liquid to flow into said passages and to be picked up by the rising gas therein to form a spray, said members having their upper ends positioned to discharge the spray onto the under surface of said orifice plate.

3. In a gas and liquid contact apparatus, a treating zone comprising an orifice plate carrying a blanket of liquid and containing orifices through which the gas to be treated passes upwardly at a rate to prevent downward flow of the liquid therethrough and baffles over said orifices against which the gases impinge, and a spray zone beneath said treating zone, said spray zone comprising a diaphragm having elongated slots through which said gas passes upwardly, means maintaining a blanket of liquid on said diaphragm and members forming open-ended passages extending upwardly above said slots and registering therewith, said members having their lower ends extending into said liquid blanket but spaced from said diaphragm to permit liquid to flow into said passages and to be picked up by the rising gas therein to form a spray, said members having their upper ends positioned to discharge the spray onto the under surface of said orifice plate.

4. In a gas and liquid contact apparatus, a treating zone comprising an orifice plate carrying a blanket of liquid and containing orifices through which the gas to be treated passes upwardly at a rate to prevent downward flow of the liquid therethrough and baffles over said orifices against which the gases impinge, and a spray zone beneath said treating zone, said spray zone comprising a diaphragm having openings through which said gas passes upwardly, liquid drain passages communicating with said diaphragm to discharge excess liquid therefrom, weirs surrounding said drain passages for maintaining a blanket of liquid of a predetermined depth on said diaphragm, and means forming unobstructed passages extending upwardly above said openings and registering therewith, said means having an opening into said liquid blanket to permit liquid to flow into said passages and to be picked up by the rising gas therein to form a spray, said passages being positioned to discharge the spray onto the under surface of said orifice plate.

5. In a gas and liquid contact apparatus, a treating zone and a spray zone beneath said treating zone comprising an orifice plate carrying a blanket of liquid and containing orifices through which the gas to be treated passes upwardly at a rate to prevent downward flow of the liquid therethrough and baffles over said orifices against which the gases impinge, said spray zone comprising a central diaphragm and a plurality of radial struts supporting the same, a plate secured to said central diaphragm and to said struts, liquid discharge means associated with said struts to discharge liquid from said spray zones, weirs associated with said discharge means to maintain a liquid blanket of a predetermined depth on said plate, said plate having slots therein through which said gas passes upwardly at a velocity suited to prevent downward flow of liquid therethrough, and means forming unobstructed passages extending upwardly above said slots and registering therewith, said means having an opening into said liquid blanket to permit liquid to flow into said passages and to be picked up by the rising gas therein to form a spray, said passages being positioned to discharge the spray onto the under surface of said orifice plate.

6. In a gas and liquid contact appparatus, a treating zone comprising an orifice plate containing orifices through which the gas to be treated passes and having baffles over said orifices adjacent which the gases impinge, and a spray zone beneath said treating zone, said spray zone comprisng a central diaphragm and a plurality of radial struts supporting the same, a plate secured to said central diaphragm and to said struts, liquid discharge means associated with said struts to discharge liquid from said spray zones, weirs associated with said discharge means to maintain a liquid blanket of a predetermined depth on said plate, said plate having slots therein through which said gas passes upwardly at a velocity suited to prevent downward flow of liquid therethrough, and means forming unobstructed passages extending upwardly above said slots and registering therewith, said means having an opening into said liquid blanket to permit liquid to flow into said passages and to be picked up by the rising gas therein to form a spray, said passages being positioned to discharge the spray onto the under surface of said orifice plates for washing the same.

DAVID P. GRAHAM.

REFERENCES CITED

The following references are of record in the file of this patent:

UNITED STATES PATENTS

| Number | Name | Date |
|---|---|---|
| 1,741,519 | Huff | Dec. 31, 1929 |
| 2,222,565 | Kraft | Nov. 19, 1940 |
| 2,319,814 | Harmon | May 25, 1943 |